June 24, 1941.  E. P. DRAKE  2,246,843
AUTOMATIC OLIVE PITTING MACHINE
Filed Dec. 13, 1938  13 Sheets-Sheet 1
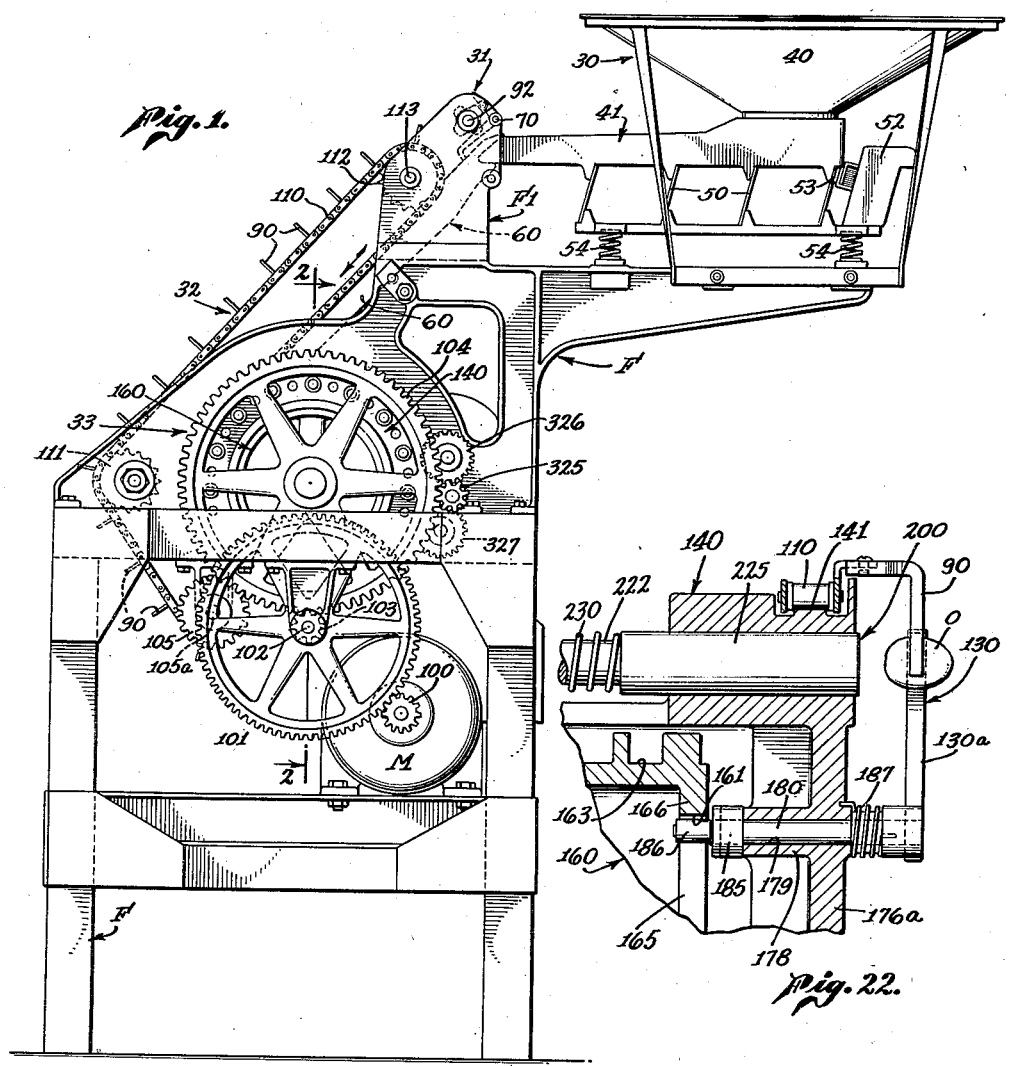
Fig. 1.
Fig. 22.
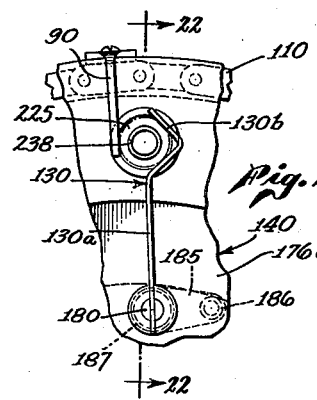
Fig. 21.
Inventor
EDWARD P. DRAKE,
By Hubert A. Huebner
Attorney

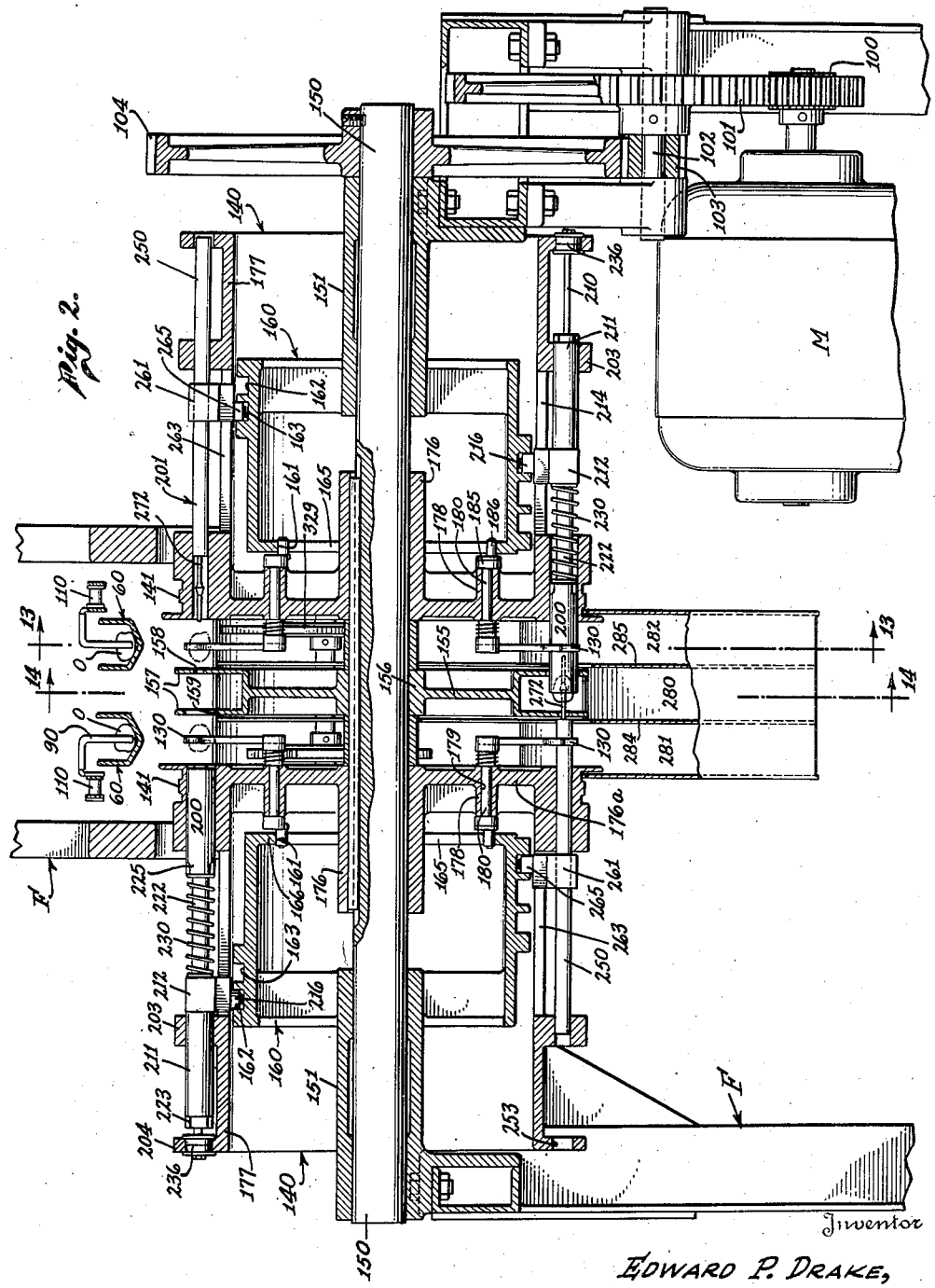

June 24, 1941.  E. P. DRAKE  2,246,843
AUTOMATIC OLIVE PITTING MACHINE
Filed Dec. 13, 1938   13 Sheets-Sheet 3
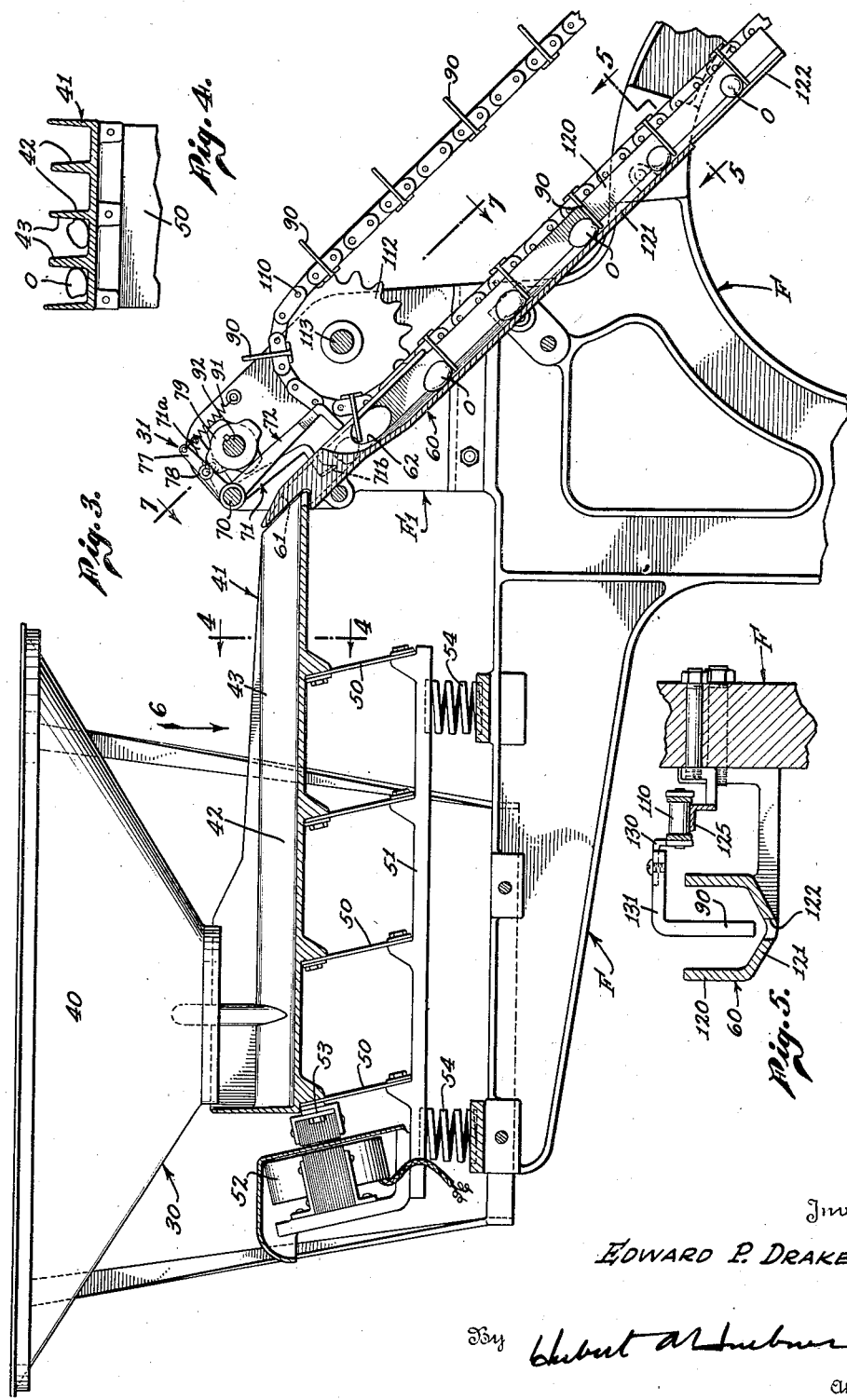
Inventor
EDWARD P. DRAKE,
By Hubert A. Huebner
Attorney

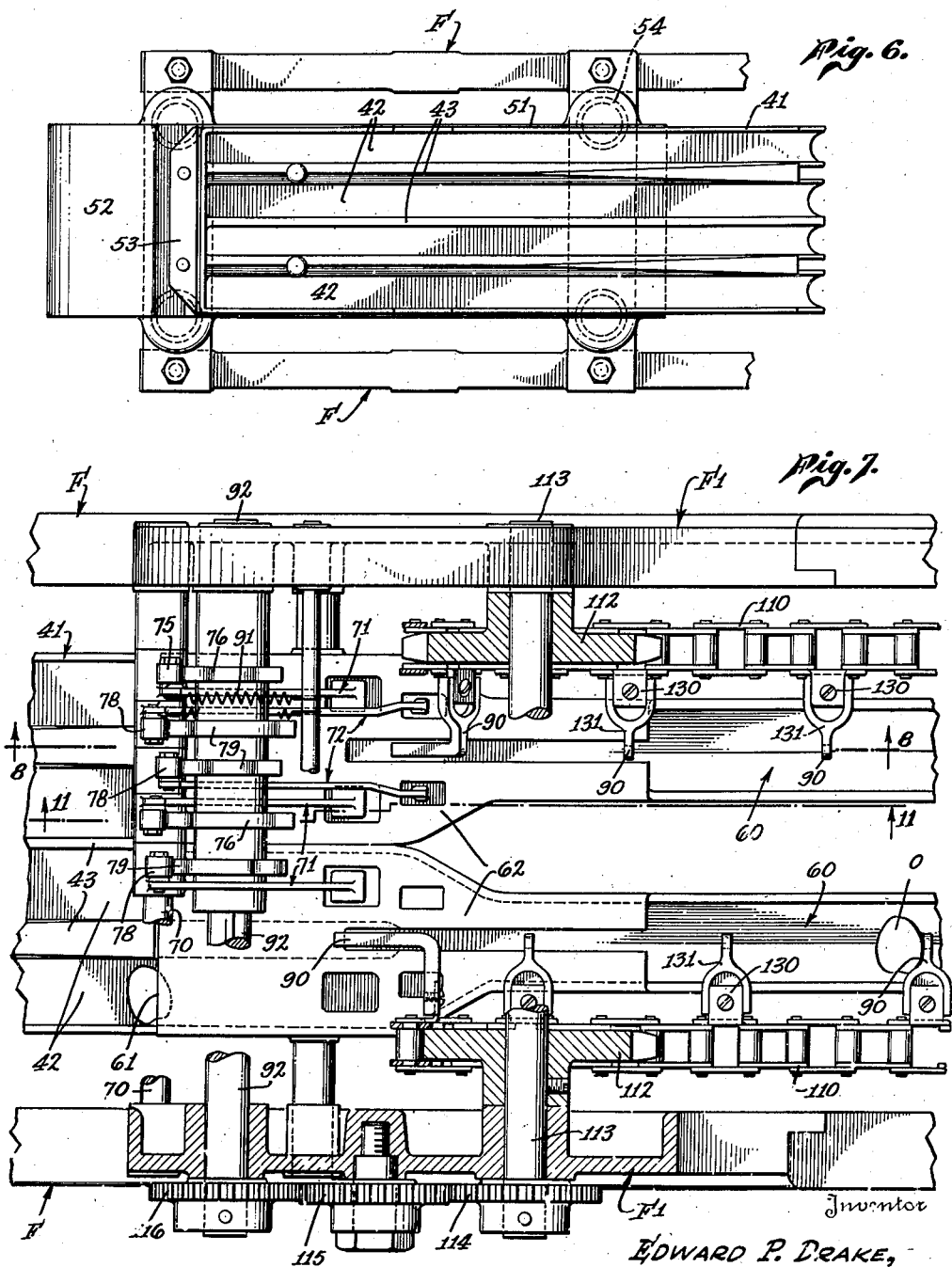

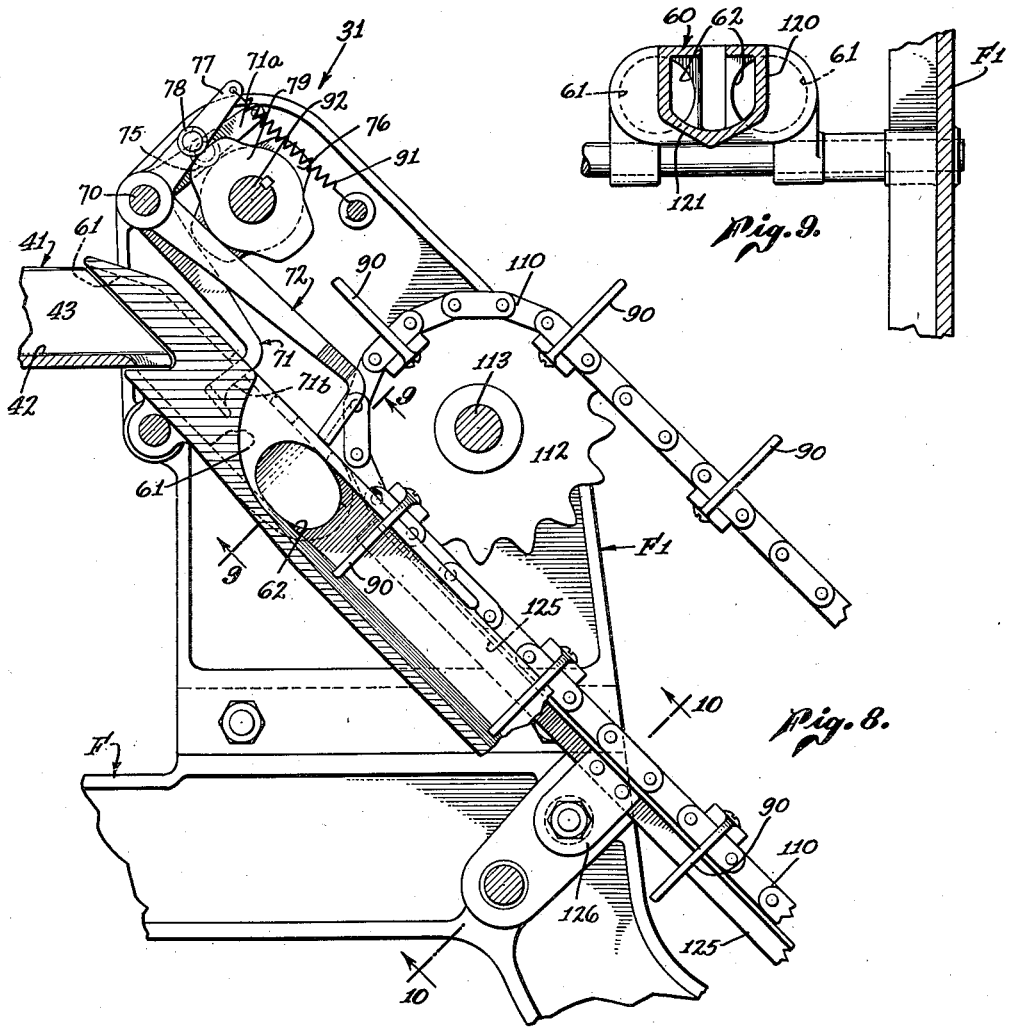
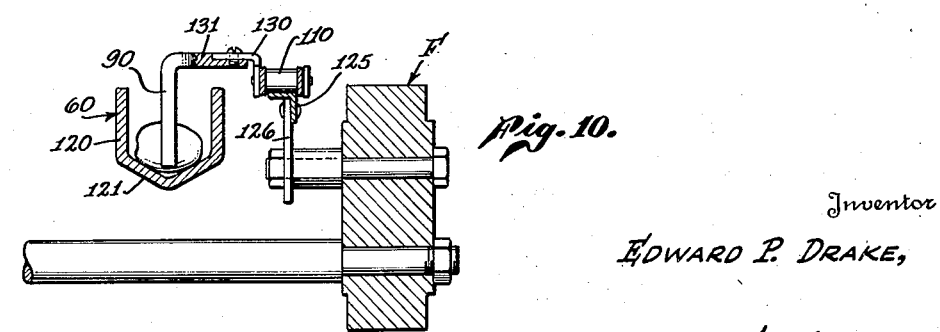

June 24, 1941.  E. P. DRAKE  2,246,843
AUTOMATIC OLIVE PITTING MACHINE
Filed Dec. 13, 1938  13 Sheets-Sheet 6

Inventor
EDWARD P. DRAKE,
By Hubert A. Lubner
Attorney

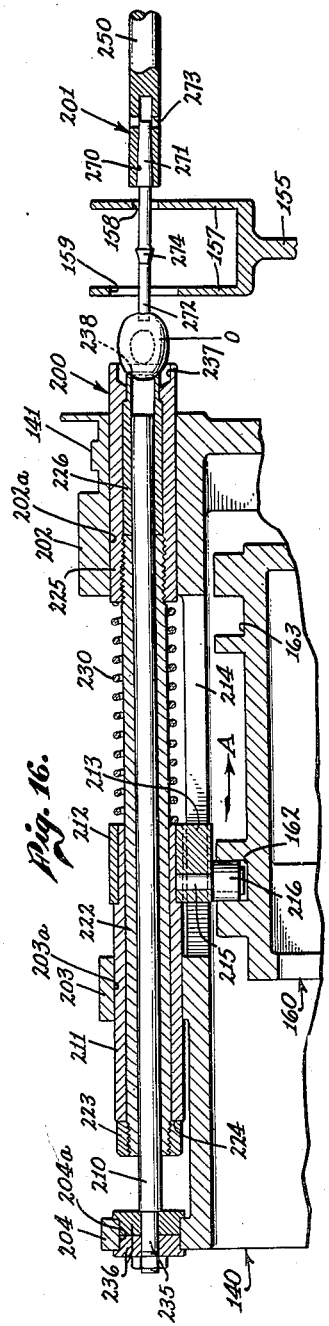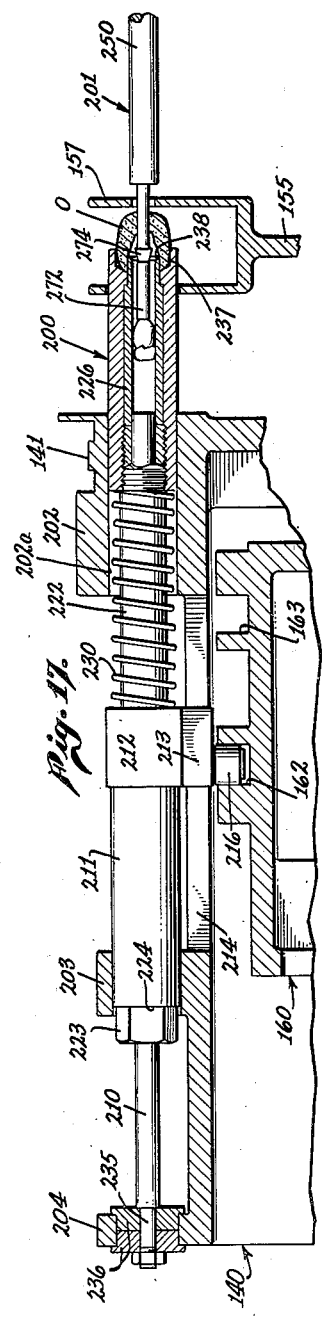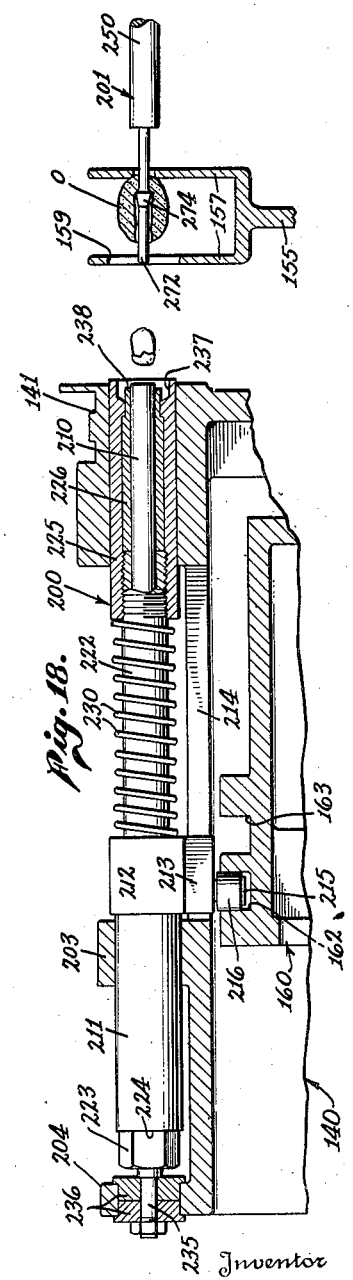

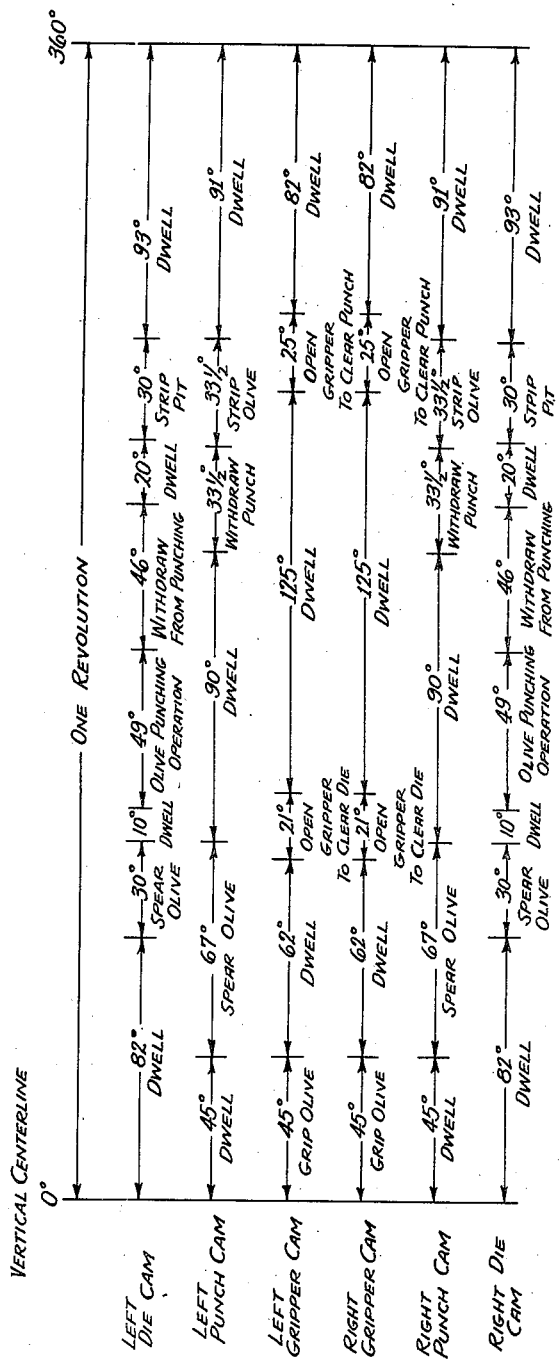
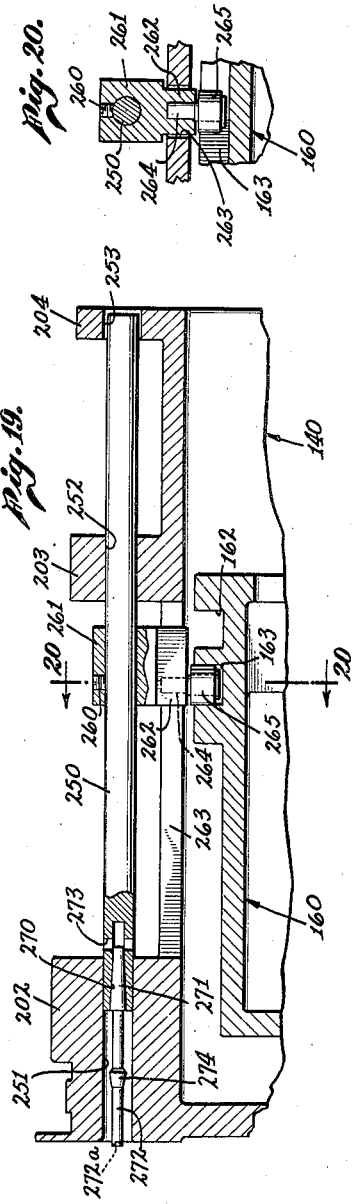

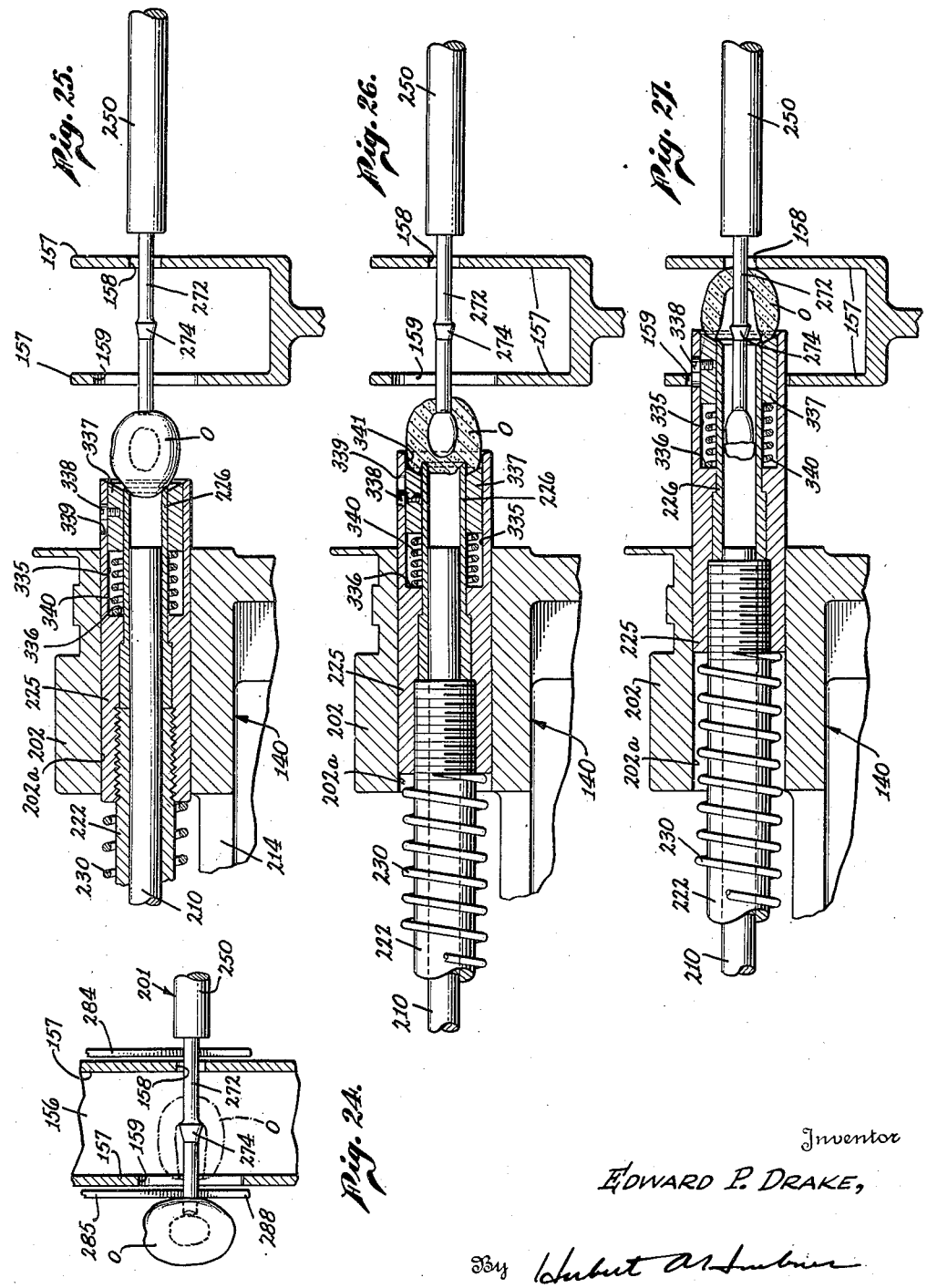

June 24, 1941. E. P. DRAKE 2,246,843
AUTOMATIC OLIVE PITTING MACHINE
Filed Dec. 13, 1938 13 Sheets-Sheet 13

Inventor
EDWARD P. DRAKE,
By Colbert A. Fuchner
Attorney

Patented June 24, 1941

2,246,843

UNITED STATES PATENT OFFICE 2,246,843

AUTOMATIC OLIVE PITTING MACHINE

Edward P. Drake, Los Angeles, Calif., assignor to Lindsay Ripe Olive Company, Lindsay, Calif., a corporation Application December 13, 1938, Serial No. 245,431

12 Claims. (Cl. 146—27)

This invention relates to the fruit packing industry, and is an automatic machine for pitting olives in preparation for packing them in jars or cans.

It is intended to handle olives of a predetermined regular grade as to size. Different grades may be put through at different times by substituting certain parts to accommodate olives of the grades to be pitted.

In removing pits from olives it is necessary that each olive be firmly held or advanced in a predetermined position while a punch enters from one end of the olive and is forced longitudinally therethrough, or the olive is thrust against the punch, to push the pit out through the other end of the olive. The pit, however, may not be struck out through the side of the olive, as to do so practically destroys the olive. This is because both olive and pit are oblong.

Previous machines for pitting olives have been introduced. In one of these the olives are individually placed by hand in dies which hold the olives during the punching operation. The slowness, expense, and danger to the attendants of such hand fed machines make their use unsatisfactory for large commercial production. This machine is not automatic, in that it must be hand fed. It must be remembered, moreover, that there are also machines used for pitting cherries and other globular fruits in which the seed or pit may be ejected through any part of the wall, and which will not perform on olives.

In my co-pending application, Serial Number 160,380, filed August 23, 1937, which has matured to Patent No. 2,205,397 granted June 25, 1940, I have disclosed what I believe to be the first olive pitting machine in which olives are fed automatically to the pit ejecting mechanism. My present application is a continuation in part of that one.

Objects of my invention are to provide a machine adapted: to handle a continuous supply of olives, which may be from boxes or any other bulk delivery into a hopper; to transfer from the hopper a continuous flow of olives to a metering device which spaces their travel; to position the olives in the region of a die and punch mechanism; to eject the pits of the olives longitudinally thereof by the combined action of a die and punch; and to deliver the pitted olives in one container, and the pits in another.

Another object is to provide a dual die and punch mechanism which doubles the output with but a slight increase in the space occupied by a single such mechanism.

Another object is to provide a unique design of die which makes a circular cut in the end of the olives opposite to the end at which the punch enters, to facilitate the function of the punch, and enable the pit to be more cleanly severed from the meat of the olive.

The features which make this machine especially suitable for pitting olives, do not in any way detract from its utility for pitting cherries and other globular fruits.

Other objects and advantages will appear from further description.

In the drawings—

Figure 1 is a side elevation of the machine.

Figure 2 is a somewhat enlarged section taken on the line 2—2 of Figure 1.

Figure 3 is a considerably enlarged side elevation of the hopper, feed and metering mechanism, seen from the side opposite that of Figure 1.

Figure 4 is a fragmentary section taken on line 4—4 of Figure 3, illustrating the delivery passages in a vibrating tray.

Figure 5 is a fragmentary section taken on line 5—5 of Figure 3, showing parts of the inclined feeding and positioning mechanism.

Figure 6 is a plan of the vibrating tray, as seen from the arrow 6 in Figure 3.

Figure 7 is a section of the metering device taken on line 7—7 of Figure 3.

Figure 8 is an enlarged side view, partly in section, on the line 8—8 of Figure 7.

Figure 9 is a fragmentary section taken on line 9—9 of Figure 8.

Figure 10 is a fragmentary section taken on line 10—10 of Figure 8.

Figure 16 is a detailed longitudinal section of a die with parts in position just after receiving an olive.

Figure 17 is a similar view after the olive pit has been ejected by a punch.

Figure 18 is another similar view after the olive has been withdrawn from the die, and the pit expelled therefrom.

Figure 19 is a detailed longitudinal section of a punch.

Figure 20 is a section of the punch taken on line 20—20 of Figure 19.

Figure 21 is a fragmentary detail of the olive spacer and finger gripping device seen previously in Figure 2, etc.

Figure 22 is a section taken on line 22—22 of Figure 21.

Figure 23 is a chart of the cam action of the cams cooperating with the main drum, and has particular reference to Figure 15.

Figure 24 is a fragmentary section on the line 24—24 of Figure 14 illustrating the stripping of an olive which has been turned across the die and punch and remains unpitted.

Figure 25 is a longitudinal section of a modified form of die, and its cooperating punch.

Figures 26 and 27 show the die of Figure 25 in successive stages of operation.

Figure 11:
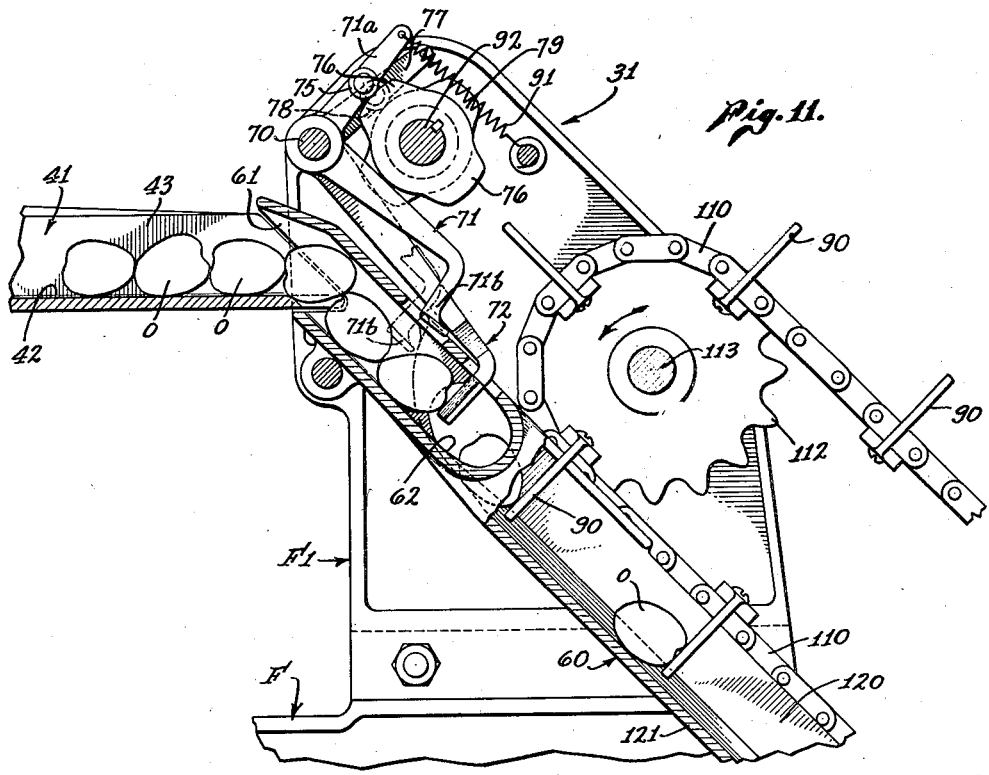
Figure 11 is an enlarged side view, partly in section, of the same region of the metering device as shown in Figure 8, but taken on the line 11—11 of Figure 7.

A frame F, of suitably rigid construction, supports the various parts of the machine.

For convenience in describing, I will refer to a feeding device 30, a metering device 31, a spacing and positioning mechanism 32, and a punching mechanism 33. This is the order in which olives pass through the elements of the machine.

The feeding device comprises a hopper 40, the lower constricted end of which communicates with a vibrating tray 41 having a plurality of delivery passages 42. Each passage is deep enough and wide enough to freely accommodate a single line of olives O. I have designed the present machine with four such delivery channels or passages formed in the tray 41, being separated by longitudinal dividing fins 43. Olives poured into the hopper 40 descend by gravity through its lower constricted end, and are distributed into the four delivery passages 42.

The tray 41 is mounted upon a plurality of webs 50 slightly inclined from the vertical, which are in turn carried upon a base plate 51. The webs 50 have sufficient rigidity to support the tray in its normal horizontal elevated position, but are flexible enough to permit vibration of the tray by a magnetic vibrator 52 of conventional design, the armature of which is connected at 53 to one end of the tray. The base plate 51 is mounted upon coil springs 54 to isolate the vibration of the tray from the frame F.

Vibration of the tray causes olives to travel along the delivery passages 42 toward the metering device which will be next described.

The purpose of this metering device is to receive the olives from the four delivery passages, space their subsequent travel, and divert them into two inclined positioning chutes or troughs 60 (see Figures 7 to 11 inclusive). It has been found that four of the delivery passages are advisable to assure a continuous supply of olives to two positioning chutes. Immediately below the metering device, the upper ends of the chutes are divided into four receiving mouths 61 forming in effect extensions of the delivery passages 41. Adjacent pairs of these mouths converge at 62 into the single chutes 60.

The metering device has four units, one to serve each receiving mouth, a complete description of one of which units will suffice.

Mounted in an extension F1 of the frame is a stationary shaft 70. Journaled to rock on this shaft is a retaining finger 71, and a cooperating holding finger 72. The finger 71 is in the form of a crank having an arm 71a and a tip 71b. The arm is provided with a roller 75 which makes contact with a cam 76 hereinafter described. The tip engages the olives, in turn, as they enter mouth 61, permitting them to enter one at a time into the space between tip 71b and holding finger 72. Rise and fall of the tip 71b, effected by action of the cam 76, secures this function. There is room for only one olive between the tip 71b and the finger 72. After an olive has been allowed to pass tip 71b it lodges momentarily against finger 72.

Finger 72 is also in the form of a crank, provided with an arm 77 which has a roller 78 bearing on a cam 79 later described, which causes a rise and fall of the finger 72, alternating with the rise and fall of tip 71b.

There being an olive lodged against finger 72, the timing of the cams is such that when tip 71b falls into the position shown in dotted lines in Figure 11, finger 72 rises into the position shown in Figure 8. Olives crowding into the mouth 61 are thus retained there, while the olive momentarily lodged against finger 72 is released, and rolls by gravity down chute 60, where it is caught by a spacer 90.

This action of the retaining finger 71 and holding finger 72 prevents more than one olive at a time passing finger 72, which is important to the subsequent handling of the olive.

Springs 91 yieldably urge the retaining finger 71 and holding finger 72 against the respective cams 76 and 79.

These cams are keyed to a shaft 92 which is journaled in the frame extension F1. Each cam is designed with two raised portions, thus causing the finger it actuates to rise and fall twice with each revolution. The raised portions of the cams 76 are offset 90° from those of the cams 79, being secured to the shaft 92 in pairs, for the cooperative action of a unit consisting of a retaining finger 71 and a holding finger 72.

Figure 12:
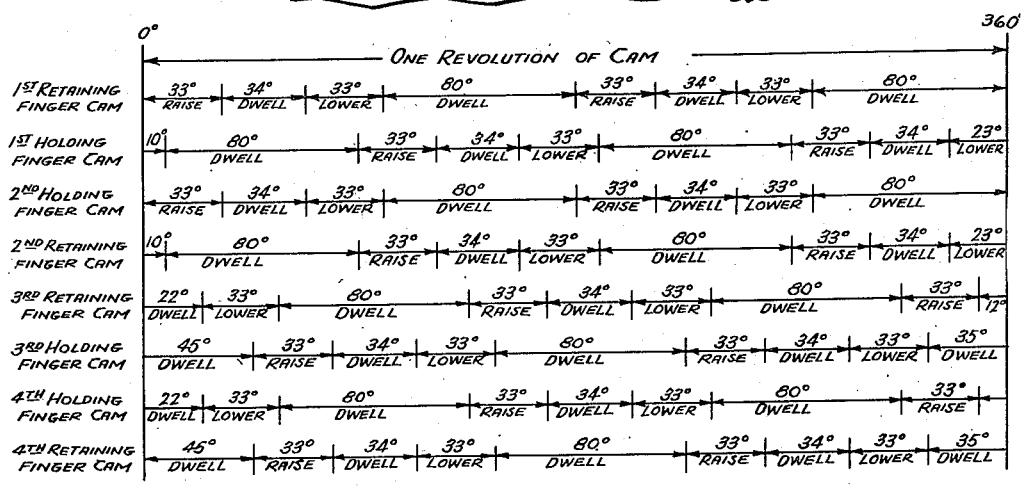
Figure 12 is a chart of the cam action of the cams in the metering device.

By reference to the chart of Figure 12, the complete cam action will be clear. The timing provides alternate releasing of olives in adjacent receiving mouths 61, at a rate to deposit one olive upon each spacer 90 as the spacer passes in a manner to be later described.

Shaft 92, and consequently cams 76 and 79 are driven by the following means: Referring to Figure 1, an electric motor M is mounted on frame F. On the shaft of the motor is a pinion 100, meshing with a gear 101 keyed to a shaft 102. On the shaft 102 is a small gear 103, which meshes with a large gear 104. This gear meshes with a smaller gear 105 keyed to shaft 105a to which is attached a sprocket 106 (see Figure 13). Driven by this sprocket is an endless chain 110 which travels over an intermediate sprocket 111 and an upper sprocket 112. This latter sprocket is keyed to a shaft 113 journaled in the frame extension F1 (see Figure 7). At the end of the shaft 113 opposite the sprocket 112 is a gear 114 which meshes with an intermediate gear 115, and this in turn meshes with a gear 116 keyed to the cam shaft 92. Power from the motor is thus transmitted through the agencies mentioned to the cams 76 and 79 for the purposes already described, and to other moving parts as will presently appear.

The spacing and positioning mechanism 32 begins at the upper end of the chutes 60 and includes various associated mechanism from that point in the travel of the olive until the olive has been seized by the die and punch in the central part of the machine. It consists primarily of chutes 60, spacing means including the spacer 90, and gripping devices which come into play near the lower end of the chutes, and cooperate with the spacers 90 to grip the olive and correctly hold it to be received by the die.

The chutes each comprise a trough having vertical side walls 120 and a bottom 121 U shaped in cross section near the hopper and as in Figure 9, and feathering into a V shaped cross section toward the lower end, as in Figure 10. The width of the trough is slightly greater than the length of the olives to be pitted. The chute is slotted as at 122 for a space adjacent its lower end for a purpose later disclosed.

To one side of each chute is an angle iron guide bar 125 fastened to a bracket 126 on the frame extension. This guide bar furnishes a track support for the chain 110 in its descent, the chain being aligned slightly to one side of the chute 60, and parallel thereto.

Secured to every third link in the chain is the spacer 90 previously referred to (see Figure 10). Each spacer consists of a Y shaped bracket 130 substituted for the chain link plate on one side of the chain, to which bracket is screwed for lateral adjustment a member 131 bent at right angles, the end extending into the chute 60, and adapted to travel freely therein.

Olives descend in the chute, rolling and sliding behind the spacers 90. No matter what the position of each olive as it is released into the chute, the configuration of the bottom of the trough, and the length of travel to the lower end of the chute result in the olive invariably assuming a position with its longitudinal axis transverse of the chute as it approaches the lower end thereof.

I have found that a chute which has a V cross section its entire length will function to turn the olives crosswise in the chute most of the time; but that occasionally an olive, striking the bottom of the chute squarely on one end will roll down end over end and fail to assume a crosswise position. To eliminate this possibility, the upper end of the chute has a U cross section as described. Olives rolling upon this form of chute will always topple one way or the other. As this rounded, almost flat bottom section of the chute merges into the section with the more sharply inclined walls, the olives, having toppled to one side or the other, eventually end their downward journey rolling barrel-like in the chute with their axis transverse thereof.

The slot 122 is not wide enough to affect the movement or position of the olive. It does permit, however, a narrow gripper 130 (see Figure 13) to enter behind the olive and close in upon same, the olive being gripped between gripper 130 and spacer 90 as at 132. The gripper and spacer travel together in this relationship almost to the position of the olive at 133 (Figure 13) at which time the die and punch have seized the olive, the spacer travels on tangentially, and the gripper is retracted.

Upon leaving the guide bar 125, the chain 110 follows the contour of a drum 140 which is a part of the die and punch mechanism and is supported thereby on a cylindrical track 141; having served its function, the chain passes around sprocket 106 and returns over sprocket 111 to the upper sprocket 112.

The grippers 130 are so intimately involved with the die and punch mechanism, that a detailed description of them must follow a partial description of this latter mechanism.

Referring now especially to Figure 2, a main shaft 150 is journaled in end bearings 151 which are carried by the frame F. This main shaft has keyed to it the gear 104 by which it is rotated.

On the center of the shaft is keyed a disc 155 having a hub 156 and an outer section consisting of bifurcated annular flanges 157. These flanges are spaced apart somewhat more than the length of an olive, and have regularly spaced holes 158 and 159 in a series concentric with the axis of the disc. The holes 158 are of a diameter large enough to accommodate passage of a punch, and small enough to reject an olive. The holes 159 are large enough to accommodate a die the outer diameter of which is slightly greater than the diameter of an olive. These holes alternate in the series, and the series on opposite flanges are offset so that hole 158 in one flange is concentric with the hole 159 in the opposite flange. This is well illustrated in Figures 2 and 14.

Except for the gear 104 and the unitary disc 155, the die and punch units on each side of line 14—14 of Figure 2 are twins, and only one will be described in detail.

Fixed to the bearing 151, and if desired, cast therewith, is a cam barrel 160. This of course remains stationary. This cam barrel provides three separate cams: an internal gripper cam 161, an external die cam 162, and an external punch cam 163.

The gripper cam 161 comprises a cam race 165 of the irregular contour illustrated, formed upon the inner face of an annular flange 166 which is part of the cam barrel. The physical configuration of this track may be seen in Figure 13, and its action and relation to the die cam and punch cam is analyzed in the chart, Figure 23. Its purpose is to operate and control the grippers 130.

The drum 140 having a hub 176 is keyed to the shaft 150, by which it is rotated. This drum is formed with an annular central web 176a and a peripheral extension 177.

Disposed in the web and concentric with the axis of the drum is a series of regularly spaced bearing lugs 178. These lugs 178 have holes machined to afford bearing surfaces 179 for shafts 180 of the grippers 130.

Each gripper 130 includes an extension member 130a formed with a pocket 130b (see Figures 21 and 22), secured to and arranged to be given a partial rotation by the shaft 180. At the end of the shaft opposite the member 130a is keyed a crank 185, upon which is a roller 186 adapted to follow the gripper cam 161. A coil spring 187 is positioned upon the outer end of the shaft 180 to urge the crank 185 toward the face of the cam 161.

Referring back to Figure 13, it will be seen that as the drum 140 rotates, carrying with it the grippers 130, the rollers on the cranks of the grippers follow the cam 161. The grippers are thus held in an inactive (retracted) position until reaching the slot 122 in the chute 60, at which point the cam face recedes rather abruptly, and permits the spring 187 to urge the gripper member 130a forward against an olive which is following one of the spacers 90 (see Figure 22). The depression in the cam extends for 62° during the passing of which the die and punch have approached to seize the olive as later described. The cam face there advances slightly and opens the gripper to assure that it clears the die, which as seen in the subsequent description, has moved into the region occupied by the gripper. This advanced cam face extends to a point where in its rotation with the drum the gripper might interfere with an extended punch, and the cam face there further advances to move the gripper back for clearance of the punch. The cam permits this inactive, or retracted position of the gripper to be maintained to the starting point described. As further particulars of the cam design and action are disclosed in the chart, Figure 23, no more detailed definition is deemed necessary here.

For an understanding of additional details of the die and punch mechanism, reference should be made to Figures 16, 17, and 18. The dies are generally designated by the numeral 200, and the punches 201. They are all alike.

The drum 140 is formed with peripheral flanges 202, 203, and 204. A series of aligned holes 202a, 203a, and 204a are provided in these respective flanges, the first two holes to furnish a slide bearing for the die, and the third one to secure a stationary mandrel 210.

Figure 15:
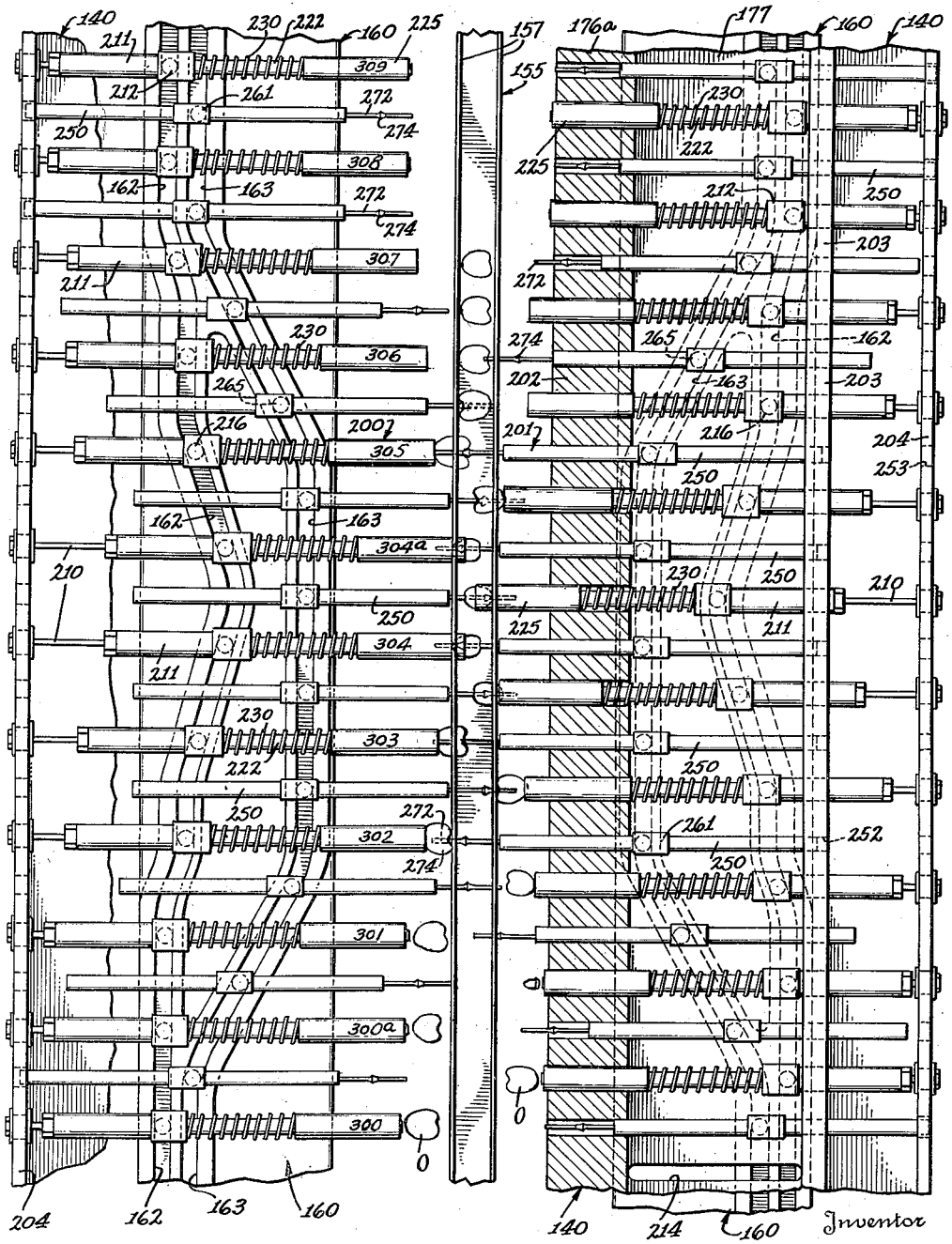
Figure 15 is a plan, with parts in section, of the main drum, cooperating cams, dies and punches, drawn to a hypothetical plane for purposes of illustration.
Figure 28:
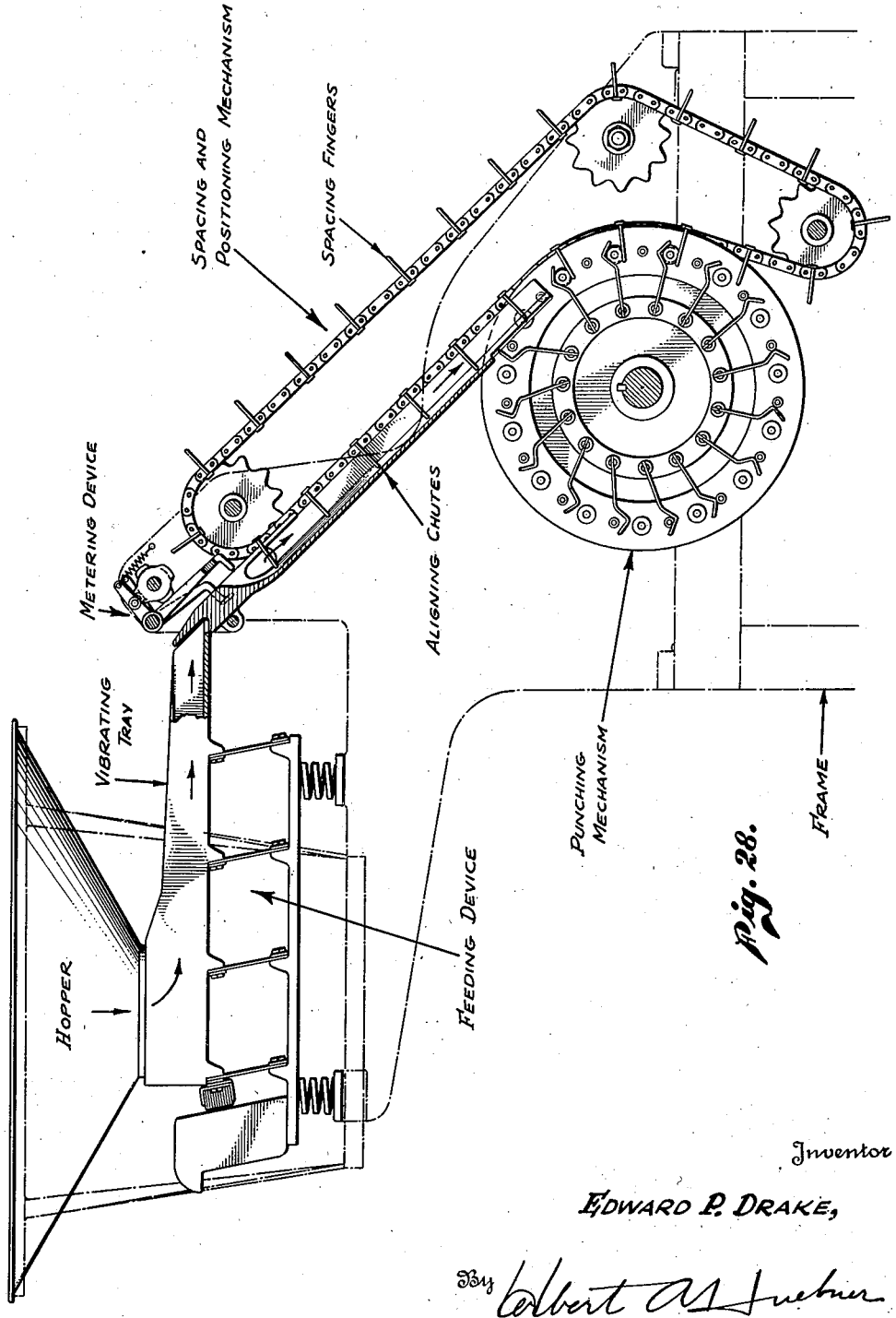
Figure 28 is a diagrammatic view of the device showing in one view the successive steps performed by the machine on the fruit operated upon.

Comprising each die is an outer sleeve 211, slidably fitting in the bearing 203a. A collar 212 encloses a portion of the sleeve, and is attached thereto. This collar has a rectangular shank 213 which is arranged to slide in a longitudinal guide slot 214 in the drum. Extending below the shank is a stub shaft 215 upon which is mounted a roller 216 which extends into the raceway and engages the walls of the die cam 162. As the drum rotates carrying with it dies 200, the roller or cam follower 216 travels through the raceway, over a varying contour as illustrated in Figure 15.

Slidable within the sleeve 211 is an inner sleeve 222 which has a stop nut 223 at one end to abut against the end 224 of the sleeve 211. The other end of sleeve 222 extends through and beyond the end of the inner sleeve. At the forward end of the outer sleeve is threaded an outer die member 225 within which tightly fits a circular die knife 226. The outer die member is slidably supported in the bearing 202a.

A coil spring 230 extends over an intermediate length of the inner sleeve 222, bearing at one end on the collar 212 and at the other against the inner end of die member 225. Thus, movement of the collar 212, imparted by the cam, in the direction of arrow A (Figure 16), is transmitted to the die member and die knife through spring 230.

The mandrel 210 extends through the inner sleeve 222 the greater part of its length. It has a reduced threaded end 235, passing through a pair of cooperating flanged washers 236 which are clamped together in the hole 204a to secure the mandrel rigidly in place. This means of mounting the mandrel is to enable the die to be withdrawn through hole 204a when disassembling for repairs, etc.

The forward end of the die member 225 is countersunk at 237 in the form of a cup to receive an olive. The die knife projects into the countersunk recess and has a sharp circular edge 238 adapted to cut through the skin and into the meat of the olive.

When the die is advanced to seize the olive, the olive first encounters the knife, and upon further pressure enters more fully into the countersunk recess 237. The knife is ground to form a slightly countersunk opening at the edge, so that even if an olive is somewhat misaligned, the pit upon being pushed through by the punch will be deflected by the inner wall of the knife and be wholly removed from the olive. Pits upon removal are temporarily retained in the knife, so long as the die member is advanced, and are subsequently expelled when the die member 225 is retracted as shown in Figure 18. In advancing, the die travels through a hole 159 in the bifurcated disc 157, so that the olive is carried into the central cavity of the disc for the completion of the pitting operation.

To make the twin units most efficient, a series of dies as described is carried on each of the drums 140.

Positioned on each drum alternately with the dies is a series of the punches 201, the punches on one of the drums axially aligning with the dies on the opposite drum.

One of the punches is shown in detail in Figures 19 and 20. This one is carried on the drum opposite the drum carrying the particular die last described. The body of the punch is a plunger 250 which has a sliding fit in bearings 251 and 252 formed in the flanges 202 and 203. The plunger may be inserted or withdrawn through a hole 253 in flange 204.

Secured to the plunger by a set screw 260 is a collar 261 having a guide shank 262 extending below to slide in a guide slot 263 in the drum similar to the slot 214. Secured in the shank is a stub shaft 264 upon which is carried a roller or cam follower 265 engaging in the raceway of cam 163. As the cam follower moves along the contour of the cam, through rotation of the drum upon which the punch is mounted, the plunger is advanced and retracted. The forward end of the plunger has a tapered bore 270 into which is driven the shank 271 of a tip 272. Hole 273 is provided for driving out tip when disassembling. It is made preferably of metal having some spring characteristics so that it will spring rather than break if deflected by an olive pit. I have found it advantageous to make the end of the tip slightly cupped, as at 272a. Such form serves better than a flat end in attacking the pit. The tip is formed with a barb 274 which will easily penetrate the olive but will offer some resistance to the olive being withdrawn. This is for the purpose of removing the olive from the die after the pit has been punched out. When, however, the olive encounters one of the flanges 157 and the punch is further retracted, the olive is stripped off and falls into a hopper 280 (see Figure 2). Pits fall and are deposited in hoppers 281 and 282. Hopper 280 has an inclined bottom 280a which causes olives to be delivered toward the rear of the machine, and hoppers 281 and 282 have bottoms 281a and 282a which deflect pits toward the front of the machine. Olives and pits are thus separately deposited in containers or upon traveling belts, as desired.

If for any reason an olive should be turned in the gripper or die and be presented with its longitudinal axis across the die and punch, the punch penetrates only part way through the olive at which time it presses the pit against the knife of the die. Continued pressure results in the die yielding by reason of spring 230, thus preventing the parts from breaking. As the tip does not under such circumstances enter into the olive far enough for the barb to take hold, the die retains the olive and upon retraction the olive is knocked from the die by mandrel 210, and the olive falls with the pits. Thus, only pitted olives are deposited in the hopper intended for them.

Occasionally an olive which has been turned so it is not pitted, as illustrated in Figure 24, sticks to the punch instead of dropping immediately into the pit hopper. To prevent these olives from being drawn with the punches through holes 159 and falling into the hopper with the pitted olives, I provide the following safeguard: Dividing walls 284 and 285 between the pitted olive hopper and the hoppers for pits are extended upwardly and their forward upper edges curved as at 286 concentric with the bifurcated flanges 157 and partially overlapping same adjacent their outer faces. Curved slots 287 but slightly wider than the diameter of the holes 158 are formed in the upward extension of the sidewalls in the path of rotation of the punches. The mouths 288 of the slots are about 15° past the lowest point in the cycle of rotation of the drum 140, at which point pitted olives have been withdrawn through the holes 159 as shown by dotted lines in Figure 24. Olives misaligned and therefore not pitted and which have stuck on the punches as shown in full lines in Figure 24, are carried up along the outside of the wall 284 or 285, the punches traveling in the slots 287, and upon further retraction of the punches are stripped off against the wall 284 or 285 and fall into one of the pit hoppers.

A study of Figures 15 and 23 will reveal in more detail the die and punch movements. The cam barrels are stationary and the drums rotate, so that the pitting operation may be completed at the lower part of the cycle. In tracing movement of the dies and punches, it is necessary to follow the die and die cam on one of the drums, and the corresponding punch and punch cam on the other drum. As well as illustrating all of the dies and punches, Figure 15 may be read to show the progressive travel of any one die and punch, which will next be described.

In position 300 the cams are at dwell and the die and punch retracted. At 300a the punch has started forward, which movement is continued at 301. Between the positions 301 and 302 the die has advanced while the punch continued in its advance, and the olive O has been seized between the die and punch. After a short dwell the die continues its advance through positions 303 and 304, during which time the punch is at dwell in its extreme advanced position. The peak of forward movement of the die occurs between 304 and 304a, during which the pit is forced from the olive into the sleeve 226. At 305 the die is retracting and has released the olive to the punch. At 306 the olive is being stripped from the punch, while the die has a short dwell, and at 307 the olive is released, the die continues its retraction, and at 308 and 309 the die remains at dwell in its fully retracted position. The punch retracts between positions 305 and 307, and it remains at dwell through positions 308 and 309 in its fully retracted position.

Figure 13:
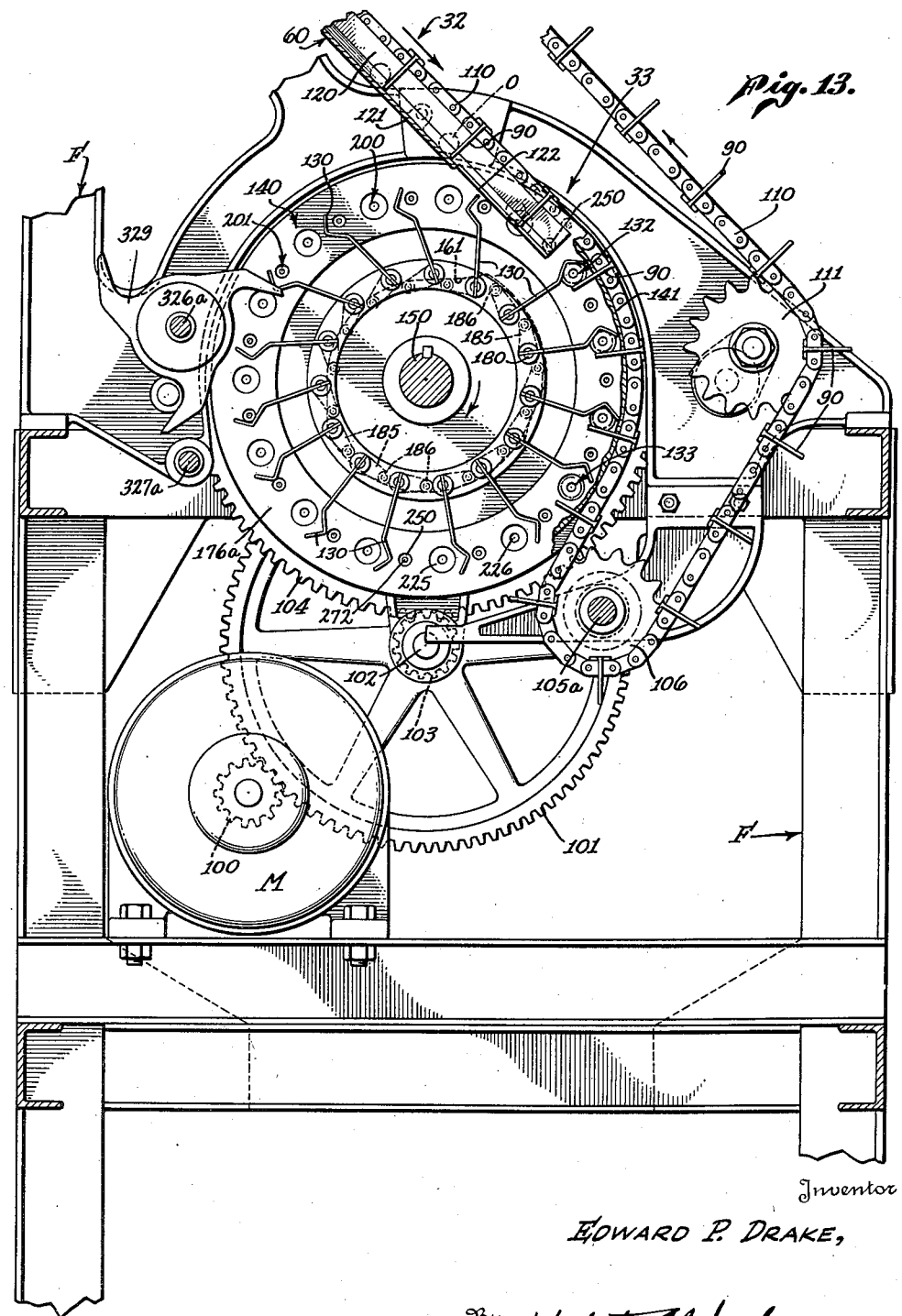
Figure 13 is a section, on the line 13—13 of Figure 2, showing the central and lower portion of the machine.
Figure 14:
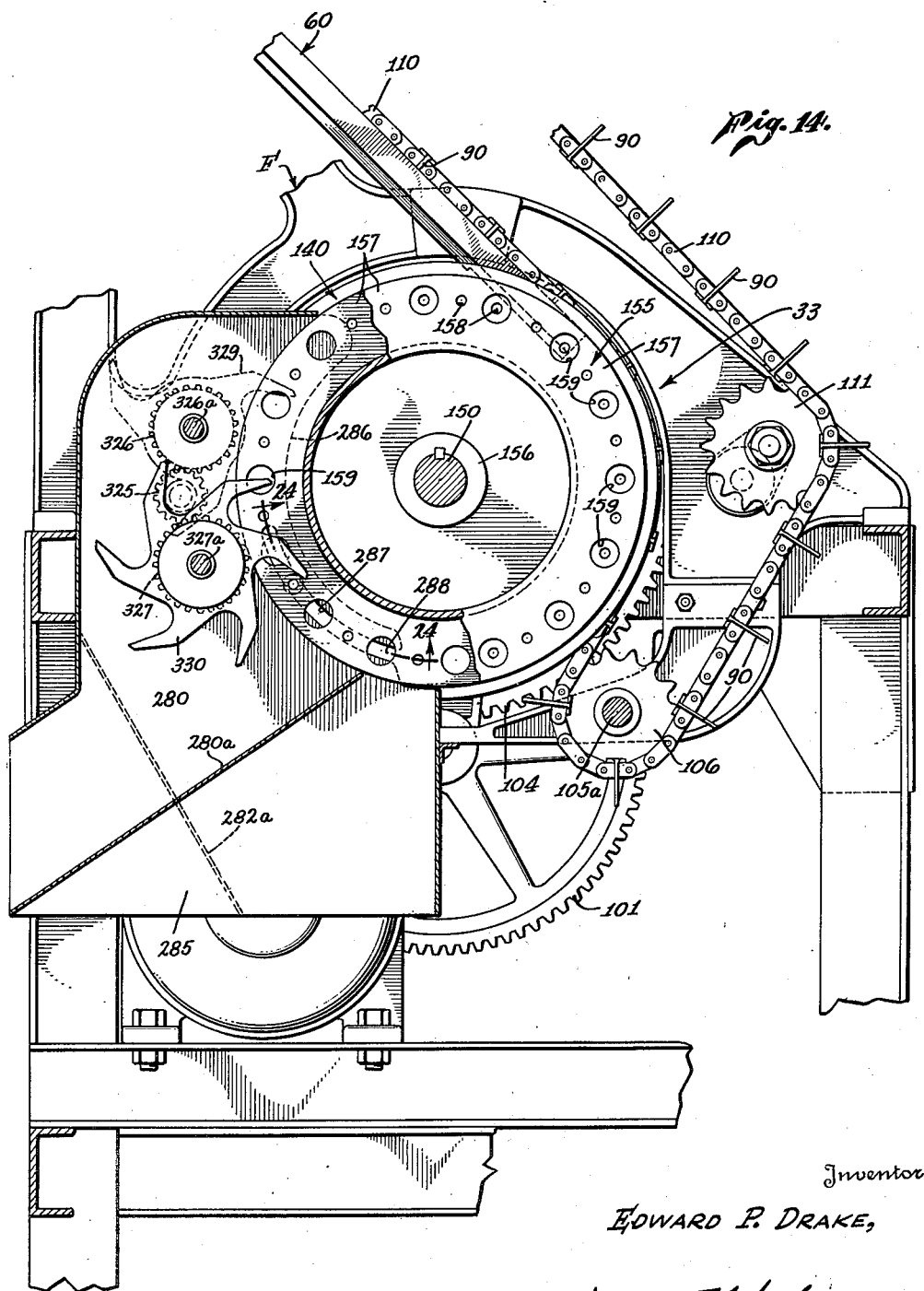
Figure 14 is a similar view taken on line 14—14 of Figure 2.

An auxiliary device for insuring that olives and pits are stripped from the punches and dies is shown particularly in Figures 13 and 14. This consists of a small gear 325 meshing with gears 326 and 327. These gears are keyed to shafts 326a and 327a respectively, upon which star wheels 329 and 330 are mounted. Wheels 329 are located to rotate close to the ends of the dies in their fully retracted position. Wheel 330 is located to rotate within the flanges 157. Gear 325 derives its rotation from the large gear 104, and serves through gears 326 and 327 to drive the star wheels. These wheels are preferably made of an artificial rubber composition which combines flexibility with resistance against deterioration from the acid present in olives. Occasionally a pit will adhere to the end of the die mandrel, and if this happens, the star wheel 329 will brush it off. Star wheel 330 performs the same function upon olives which happen to cling to the punch. The star wheel 330 may comprise two similar brushing members on the same hub in order to catch olives on either of the flanges 157.

The operation of the machine is continuous. Olives placed in bulk in the receiving hopper are distributed in the delivery passages of the vibrating tray, are transported by the vibration thereof to the metering device, where olives in adjacent pairs of passages are alternately deposited in the positioning chutes. While traveling down these chutes, the olives are caused to assume a position with their individual axes parallel to the drums by the action which is imparted by the design of bottom of the chutes, and are held properly spaced by the spacers on the endless chain. At the lower end of the chutes the grippers on the drum cooperate with the spacers to hold the olives and bring them into line with the dies and punches. The olives are seized first by the dies advancing in succession as the drums rotate, and then speared by the punches. The grippers having performed their chief function are held back by the gripper cam as their revolution on the drum carries them successively around to the point of starting. The dies and punches advance to punch out the pits, which are retained in the inner sleeves of the dies until the dies are retracted, whereupon the ends of the dies leave the mandrels exposed, and the pits having no support, fall into one of the delivery hoppers. The olives are retained upon the tips of the punches by the action of the barbs thereon, until the punches are retracted and the olives stripped off against the flanges of the bifurcated disc, whereupon they fall into the olive delivery hopper, and are discharged therefrom into a container or upon a traveling belt.

I disclose a modified form of die in Figures 25, 26 and 27, in which means are provided to aid the punch in removing the olive from the die after the pit has been punched out. It has particular utility for pitting green-ripe olives, in which the meat is relatively soft. I have found that such olives are sometimes held by vacuum in the cup of the die previously described, or held upon the die knife, the olive being so soft that the barb on the punch tears the olive instead of withdrawing it.

In my modified form of die, I provide spring ejecting means to push the olive from the die.

This is accomplished by forming sleeve 225 with a deep longitudinal recess 335 ending at an annular shoulder 336. Sliding in the recess between the knife and sleeve is a countersunk collar 337. Limits of longitudinal movement are provided by a set screw 338 engaging either end of a slot 339. A compression spring 340 is seated in the recess abutting at one end against the shoulder 336 and at the other against the collar 337.

Where the olive first encounters the die as in Figure 25, it impinges upon the knife 226. Advancement of the die causes the knife to enter the olive, and the collar 337 to retreat against the yielding pressure of the spring 340, forming an olive receiving cup 341 (see Figure 26).

The tension of the spring is such that it will yield to the force necessary to punch the pit from the olive, but when the pit is pushed through and the force of the punch against the olive thus relieved, the spring will thrust the collar 337 to its outer extremity as in Figure 27, pushing the olive ahead of it off the knife and further onto the punch, the olive cup being so reduced in depth by this movement of the collar as to offer slight, if any resistance to removal of the olive from the die, enabling the punch to retain the olive until stripped into the pitted olive hopper.

I claim as my invention:

1. An olive pitting machine comprising a pair of drums on a common axis, means to rotate the drums, a plurality of olive receiving dies on one drum and pit punches on the other drum, means to deliver and position a continuous bulk supply of olives one at a time at intervals coinciding with the rotary travel of the dies and punches and with the longitudinal axes of the olives in alignment therewith, and cam means to reciprocate the dies and punches with opposite motions to remove the pits from the olives.

2. A device as in claim 1 in which the cam means includes stationary cam barrels inside of the drums with raceways in the peripheral faces thereof, and followers on the dies and punches traveling in the raceways.

3. An olive pitting machine comprising cooperating dies and punches to hold the olives and punch out the pits, means to deliver and position the olives with the longitudinal axis of each olive aligned with the axis of a die and punch, said means including a sloping chute having a slot adjacent the lower end thereof, a traveling chain provided with spacers thereon extending downwardly into said chute, a rotating drum, and grippers carried upon the drum and adapted to advance upwardly through the slot in the chute toward the spacers to grip olives therebetween and to travel in synchronism with the spacers.

4. An olive pitting machine comprising a pair of drums on a common axis, means to rotate the drums, a plurality of olive receiving dies on one drum and pit punches on the other drum, each die being aligned with a punch, means to deliver and position the olives between the dies and punches with the longitudinal axis of each olive aligned with the axis of an aligned die and punch, said means including a traveling chain, spacers thereon, and grippers adapted to advance towards the spacers to grip olives therebetween and to travel in synchronism with the spacers, and means to reciprocate the dies and punches with opposite motions to remove the pits from the olives.

5. An olive pitting machine comprising a pair of drums on a common axis, means to rotate the drums, a plurality of olive receiving dies on one drum and pit punches on the other drum, each die being aligned with a punch, means to deliver and position the olives between the dies and punches with the longitudinal axis of each olive aligned with the axis of an aligned die and punch, said means including a traveling chain, spacers thereon, and grippers carried upon the drum which carries the die.

6. An olive pitting machine comprising a pair of drums on a common axis, means to rotate the drums, a plurality of olive receiving dies on one drum and pit punches on the other drum, and cams actuating the dies and punches to mutually advance and retract, each of said dies comprising a relatively stationary mandrel, and a sleeve enclosing the mandrel and adapted to slide thereon, the sleeve having an olive receiving cup at one end.

7. An olive pitting machine comprising a pair of drums on a common axis, means to rotate the drums, a plurality of olive receiving dies on one drum and pit punches on the other drum, and cams actuating the dies and punches to mutually advance and retract, each of said dies comprising a relatively stationary mandrel, a sleeve enclosing the mandrel and adapted to slide thereon, the sleeve having an olive receiving cup at one end, and a circular knife extending into the cup a sufficient distance to engage an olive before the olive is completely seated in the cup and to make a deep incision in the olive when it is fully seated.

8. An olive pitting machine comprising a pair of drums, means to rotate the drums, a plurality of olive receiving dies on one drum and pit punches on the other drum, means to reciprocate the dies and punches with opposite motions to remove pits from the olives, each of said punches comprising a slidable plunger, and a tip thereon having an olive retaining barb to withdraw the olive from the die after the punching operation, and means mounted on and rotating with the drum carrying the punches to obstruct passage of the olives beyond a predetermined point as the punches are retracted after the punching operation, permitting the olives to fall by gravity at a point separated from the pits.

9. A device of the character described in claim 8 in which the last named means comprises a stripper plate provided with holes in alignment with the punches large enough for the punches to pass through but not large enough for the olives to pass through.

10. An olive pitting machine comprising a pair of drums on a common axis, means to rotate the drums, a plurality of olive receiving dies on one drum and pit punches on the other drum, means to reciprocate the dies and punches with opposite motions to remove the pits from the olives, means to withdraw the olives from the dies after the pits have been removed, and means to eject the pits from the dies after the pitted olives have been withdrawn and at a point separated from the pitted olives, said last named means in each die comprising a mandrel, and a sleeve slidable thereon.

11. An olive pitting machine comprising a pair of drums, means to rotate the drums, a plurality of olive receiving dies on one drum and pit punches on the other drum, means to reciprocate the dies and punches with opposite motions to remove the pits from the olives, means on the punches to withdraw the olives from the dies, means to obstruct passage of the olives beyond a predetermined point as the punches are withdrawn after the punching operation permitting the olives to fall by gravity at a point separated from the pits, and brush members adapted to rotate in the region where the olives are disengaged from the punches to remove any olives which have failed to drop.

12. In an olive pitting machine, olive positioning means comprising an inclined chute having a U shaped cross section at the upper end portion and merging into a V shaped cross section at the lower end portion by which olives introduced into the upper end of said chute if on end are caused to topple at least partially sidewise by gravity and in traveling down said chute assume a position with their longitudinal axes crosswise of the chute, means to introduce olives into the upper end of the chute, means to grip and remove olives from the lower end of the chute and present them to a die and punch mechanism for pitting, and a die and punch mechanism for removing the pits.

EDWARD P. DRAKE.